US010755044B2

(12) United States Patent
Gonzalez et al.

(10) Patent No.: US 10,755,044 B2
(45) Date of Patent: Aug. 25, 2020

(54) ESTIMATING DOCUMENT READING AND COMPREHENSION TIME FOR USE IN TIME MANAGEMENT SYSTEMS

(71) Applicant: International Business Machines Corporation, Armonk, NY (US)

(72) Inventors: Ignacio P. Gonzalez, Madrid (ES); Fernando P. Pazos, Madrid (ES)

(73) Assignee: International Business Machines Corporation, Armonk, NY (US)

( * ) Notice: Subject to any disclaimer, the term of this patent is extended or adjusted under 35 U.S.C. 154(b) by 699 days.

(21) Appl. No.: 15/397,201

(22) Filed: Jan. 3, 2017

(65) Prior Publication Data

US 2017/0323205 A1 Nov. 9, 2017

(30) Foreign Application Priority Data

May 4, 2016 (EP) ..................................... 16382193

(51) Int. Cl.
*G06F 40/00* (2020.01)
*G06F 40/253* (2020.01)

(52) U.S. Cl.
CPC ................. *G06F 40/253* (2020.01)

(58) Field of Classification Search
CPC ................................................... G06F 17/274
USPC ........................................................ 706/46
See application file for complete search history.

(56) References Cited

U.S. PATENT DOCUMENTS

| 8,260,915 | B1* | 9/2012 | Ashear | G06F 13/00 |
| | | | | 709/224 |
| 8,271,865 | B1* | 9/2012 | Bennett | G06F 40/106 |
| | | | | 715/201 |
| 8,370,150 | B2 | 2/2013 | Toiyama et al. | |
| 8,688,602 | B1* | 4/2014 | Murray | G06N 7/005 |
| | | | | 706/12 |

(Continued)

FOREIGN PATENT DOCUMENTS

| CN | 101783881 | 7/2010 |
| CN | 101996426 | 3/2011 |

(Continued)

OTHER PUBLICATIONS

Jeff Chandler, Estimated Time to Read This Post, Eternity, WP Tavern, Retrieved from internet on Jun. 10, 2016, URL: http://wptavern.com/estimated-time-to-read-this-post-eternity, 10 pages.

(Continued)

*Primary Examiner* — Hien D Khuu
(74) *Attorney, Agent, or Firm* — Schmeiser, Olsen & Watts, LLP; Mark Vallone

(57) ABSTRACT

A method and device. The device determines an initial estimate of an amount of time for a generic user to read a document, wherein the initial estimate is determined based on a value of one or more parameters associated with the document. The device determines an estimate correction parameter for modifying the determined initial estimate to compensate for a particular user who will read the document, a particular context n which the particular user will read the document, or a combination thereof. The device uses the initial estimate and the estimate correction parameter to determine an estimate of the amount of time for the particular user to read the document.

6 Claims, 4 Drawing Sheets

(56) References Cited

U.S. PATENT DOCUMENTS

| | | | |
|---|---|---|---|
| 9,715,482 B1* | 7/2017 | Bjorkegren | G06F 3/04855 |
| 2012/0154372 A1* | 6/2012 | Buck | G06F 16/40 |
| | | | 345/418 |
| 2013/0283145 A1* | 10/2013 | Argent | G06F 17/241 |
| | | | 715/231 |
| 2014/0082187 A1 | 3/2014 | Ashear | |
| 2014/0234810 A1 | 8/2014 | Flor et al. | |
| 2014/0333435 A1 | 11/2014 | Huang et al. | |
| 2015/0193554 A1* | 7/2015 | Yang | G06F 16/9535 |
| | | | 715/205 |
| 2016/0051168 A1* | 2/2016 | Kamali | A61B 5/1123 |
| | | | 600/595 |

FOREIGN PATENT DOCUMENTS

| | | |
|---|---|---|
| CN | 104111820 | 10/2014 |
| EP | 2608002 | 6/2013 |
| WO | WO2012004785 | 1/2012 |
| WO | WO2014145228 | 9/2014 |
| WO | WO2014159297 | 10/2014 |

OTHER PUBLICATIONS

Arienne Holland, How Estimated Reading Times Increase Engagement With Content, Retrieved from internet on Mar. 10, 2016, URL: http://marketingland.com/estimated-reading-times-increase-engagement-79830, 7 pages.

Bill Renk, Implementing an Estimated "Read Time" on Articles, May 1, 2013, URL: https://www.phase2technology.com/blog/implementing-an-estimated-read-time-onarticles/, 5 pages.

* cited by examiner

US 10,755,044 B2

ESTIMATING DOCUMENT READING AND COMPREHENSION TIME FOR USE IN TIME MANAGEMENT SYSTEMS

TECHNICAL FIELD

The present invention relates to document reading, and, more specifically, to determining an estimated time for a user to read a document.

BACKGROUND

Currently, reading speed is calculated for predefined text and for e-books.

SUMMARY

The present invention provides a method and associated device and computer program product. The device determines an initial estimate of an amount of time for a generic user to read a document, wherein the initial estimate is determined based on a value of one or more parameters associated with the document. The device determines an estimate correction parameter for modifying the determined initial estimate to compensate for a particular user who will read the document, a particular context in which the particular user will read the document, or a combination thereof. The device uses the initial estimate and the estimate correction parameter to determine an estimate of the amount of time for the particular user to read the document.

BRIEF DESCRIPTION OF THE DRAWINGS

Example implementations of the present invention will be described below with reference to the following drawings.

DETAILED DESCRIPTION

Figure 1:
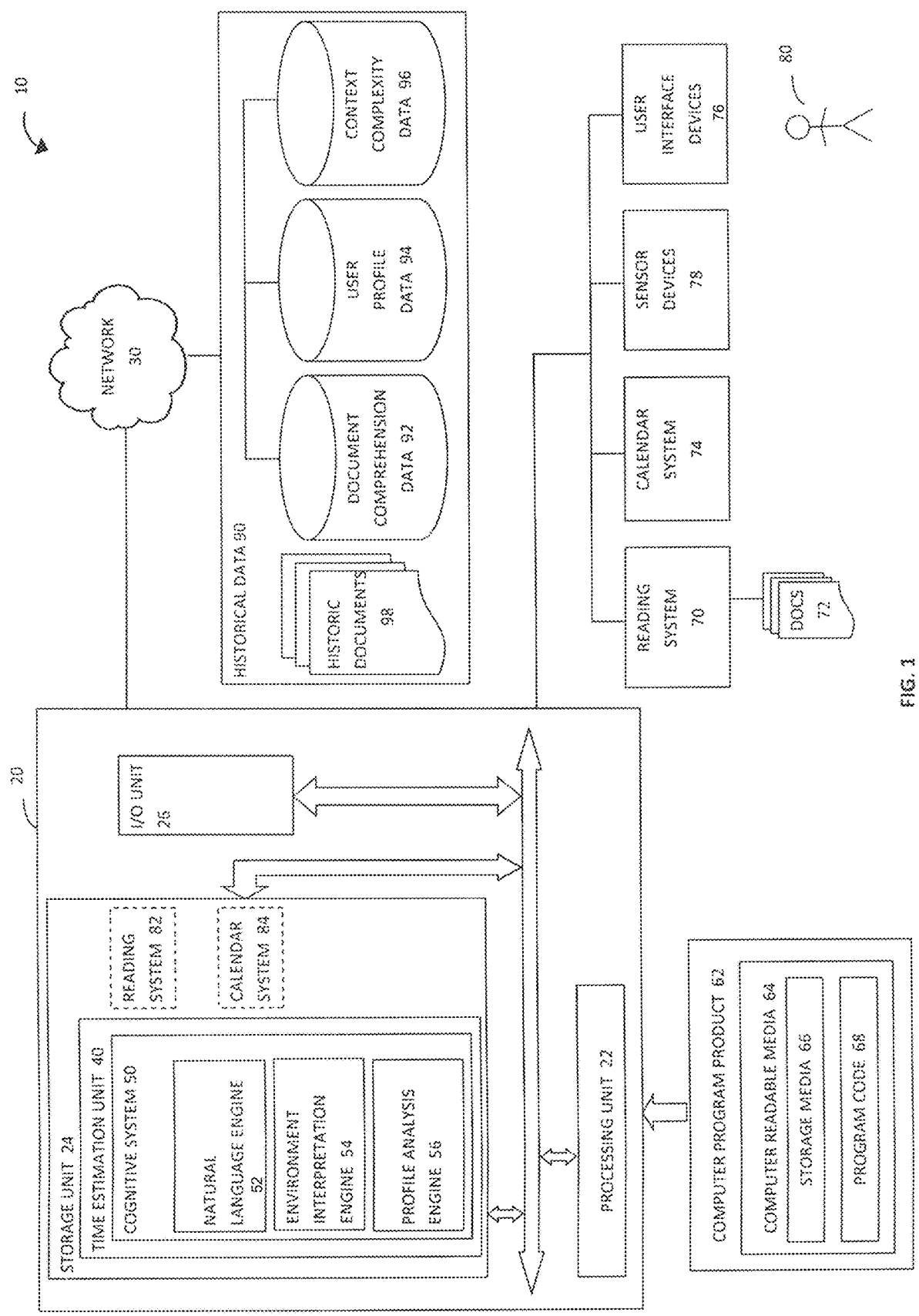
FIG. 1 is a block diagram of a system, in accordance with embodiments of the present invention.

An estimate of an amount of time for a user to read a document is useful for a user to plan and manage the user's own time. Traditionally, a user reading a printed document, such as a book, is able to intuitively predict the amount of time needed by the user to read a remainder, or a section, of the book based on the number of physical pages to be read and the user's reading speed when reading the book. However, increasingly, documents are read by users on electronic devices including computers, laptops, tablet devices and electronic book readers. Such reading methods make it more difficult for the user to intuitively estimate the amount of time to be taken to read a document, due to the absence of physical pages.

Electronic book readers may include system features that provide an estimate of a remaining reading time for a user to finish reading a book, or a part thereof, based on the user's historical reading speed and the number of words involved. However, such estimates may be inaccurate, as such estimates do not consider other factors that may influence the user's reading speed.

The present invention is concerned with estimating an amount of time for a user to read a document, which may be printed or displayed on a screen of an electronic device such as a book reader. In particular, the present invention proposes techniques for estimating an amount of time that an individual user will take to read a document, in particular with an appropriate level of understanding of the content, based on a number of influencing factors. In this way, the estimate provided in accordance with the present invention has improved accuracy in comparison to conventional estimating techniques, since the present invention considers factors relating to reading quality as well as reading quantity. The estimate may be used for scheduling a time slot for the user to read the document in the user's time management system, such as a calendar, or the like, and so assist in planning a schedule or agenda, thereby reducing user anxiety and/or wasted time due to poor or inaccurate planning.

Example implementations of the present invention include systems, methods and computer program products for estimating an amount of time for a user to read a document. In the drawings, the same or similar features are assigned the same or similar reference numerals.

FIG. 1 is a block diagram of a system 10, in accordance with embodiments of the present invention. The system 10 may comprise a computing device 20, such as computer, laptop, special purpose device, electronic tablet or the like, having a processing unit 22 for processing data. a storage unit 24 (which represents one or more storage units and which may additionally include one or more memories such as random access memory (RAM, read-only memory (ROM), etc.) for storing data. The computing device 20 may also include an input/output (I/O) unit 26 for data communications. The I/O unit 26 may be any suitable communications interface for enabling communication of data by computing device 20 to and from external devices connected thereto, either directly via peripheral connections such as USB or Bluetooth connections, or via wired or wireless connections to a network 30, such as a Local Area Network (LAN), a Wide Area Network (WAN) or the Internet.

The computing device 20 may further include a time estimation unit 40 in accordance with example implementations of the present invention. The time estimation unit 40 may comprise a cognitive system 50 for estimating an amount of time for an individual user to read a document. In example implementations, the cognitive system 50 may comprise a natural language engine (NLE) module 52 that may receive and process data relating to a document. In example implementations, the cognitive system 50 may comprise an environment interpretation engine (EIE) module 54 that may receive and process data relating to an environment of a user. In example implementations, the cognitive system 50 may comprise a profile analysis engine (PAE) module 56 that may receive and process data relating to a user. Further details of the processing performed by the cognitive system 50, the NLE module 52, the EIE module 54 and the PAE module 56 are provided below.

In example implementations of the present invention, a computer program product 62 may be provided, as shown in FIG. 1. The computer program product 62 may include a computer readable media 64 having storage media 66 and program instructions 68 (i.e., program code) embodied therewith. The program instructions 68 may be loaded onto the storage unit 24 of computing device 20, for example as the above-described cognitive system 50 comprising modules 52, 54 and 56. The program instructions 68 may be executable by the processing unit 22 (which represents one or more processing units) of the computing device 20 to perform processing as described below with reference to FIGS. 2, 3 and 4.

In example implementations of the present invention, the cognitive system 50 may receive input data from devices external to computing device 20, such as a reading system 70 (e.g., electronic book reader) onto which documents 72 may be loaded, and a calendar system 74, via I/O unit 26. In example implementations, the cognitive system 50 may receive input data from devices external to computing device 20, which may include historical data 90 relating to previous readings of one or more documents stored as historic documents 98. For example, input data comprising document comprehension data 92, user profile data 94 and context complexity data 96 related to previous readings of historic documents 98 may be received from databases, or other data storage. In example implementations, the cognitive system 50 may receive input data from other modules of computing device 20, such as a document reading/viewing application 82 or internal calendar system 84.

In example implementations, the cognitive system 50 may receive input data from a user 80 utilizing user interface devices 76, such as a keyboard, mouse, touchscreen or touchpad. In example implementations, the cognitive system 50 may receive input data from sensor devices 78, such as a microphone, camera or thermometer. As the skilled person will appreciate, such sensor devices 78 and user interface devices 76 may be integral with the computing device 20 or may be external peripheral devices.

Input data received by the cognitive system 50 may be processed by the NLE module 52, the natural language engine (EIE) module 54 and/or the PAE module 56 and respective outputs provided, which may be used by the cognitive system 50 to determine an estimate of an amount of time for a particular user to read a particular document in a particular context (e.g., reading environment or state).

The different types of data that may be processed in accordance with example implementations of the present invention are as follows.

First, data may comprise "document data" that describes or defines a document itself, which typically comprises an actual electronic document including, for example, the electronic document's content, format and any associated metadata. Document data may relate to historic documents, which have previously been read by one or more users (e.g., historic documents 98 supra), and current documents, which a user plans to read and for which a reading time estimate is required (e.g., documents 72 supra). In relation to historic documents, the document data also may comprise one or more values of an actual time taken by users to read documents during a previous reading of the document (e.g., at a level of user understanding that is appropriate to the document or specified by the user). For example, historic document data may include a value for the actual reading time of a particular document by a particular user in a particular context, and may include an identifier for the document and/or an identifier of the user and/or an identifier of the context in which the document was read. As the skilled person will appreciate, such actual reading time data may be included with other types of data, as described below.

Second, data may comprise "document comprehension data" relating to the complexity of the document, for example defining values of "document parameters" comprising parameters of the document that indicate how difficult it is for a user to read and understand the document, and thus impact on or influence the reading time. Document comprehension data may be derived from the document data, for example as described below. Thus, document comprehension data may relate to historic documents (e.g., document comprehension data 92 supra) or be derived for current documents, for example as described below. Document comprehension data for a particular, individual document may comprise values of document parameters that impact on or influence the reading time. Example document parameters may include, inter alia, length of document (e.g., number of words, number of pages), type of document (e.g., technical report, journal article, legal document), language of document, complexity and subject matter of the content of the document. As the skilled person will appreciate, in example implementations, a set of document parameters may be predefined for use in accordance with the present invention, and a subset of such document parameters may be derived for each individual document. Actual reading time data, as described above, may also be stored with the document comprehension data for historic documents (e.g., document comprehension data 92 supra).

Third, data may comprise "user profile data" relating to a particular user who has read, or will read, the document, for example defining values of "profile parameters" comprising parameters of the user's personal profile that indicate, inter alia, the user's reading skills and/or other factors that may influence the reading time for the particular user. User profile data may be derived from an existing personal profile of a user or may be input by the user. Thus, user profile data may relate to users who have read historic documents (e.g., user profile data 94 supra) or be derived for a user that plans to read a current document, for example as described below. User profile data for a particular user may comprise values of user profile parameters that impact on or influence the reading time. Example profile parameters may include, inter alia, age, gender, education, role, language skills, subject matter expertise and other relevant personal attributes that relate to the reading skill of an individual user. As the skilled person will appreciate, in example implementations, a set of profile parameters may be predefined for use in accordance with the present invention, and a subset of such profile parameters may be derived for each individual user, for example from data input by the user or otherwise. Actual reading time data, as described above, may also be stored with the user profile data relating to users who have read historic documents (e.g., user profile data 94 supra).

Finally, data may comprise "context complexity data" relating to a particular context in which the document has been, or will be, read by a user, for example defining values of "context parameters" of the reading context that may impact on or influence the reading time. Context complexity data may be derived from raw or processed data relating to the context in which the reading has taken place or will take place. Thus, context complexity data may relate to previous reading contexts of historic documents (e.g., context complexity data 96 supra) or be derived for a current context, for example as described below. Context complexity data for a particular context may comprise values of context parameters that impact on or influence the reading time. Context parameters typically, although not exclusively, relate to the environment or state in which the user is reading, or will read, a document, including factors that may influence the mental state (e.g., concentration level) or wellbeing of the user. Example context parameters include, inter alia, environmental conditions (e.g., temperature, humidity, noise levels), time (e.g., time of day or day of week), and user fatigue conditions (e.g., stress levels, health). As the skilled person will appreciate, in example implementations, a set of context parameters may be predefined for use in accordance with the present invention, and a subset of such context parameters may be derived, for example, from data received from the environment or otherwise. Actual reading time data, as described above, may also be stored with the context complexity data relating to previous reading contexts of historic documents (e.g., context complexity data 96 supra). Further details of how the above-described types of data and associated parameters may be determined and used, in accordance with example implementations of the present invention, are described below.

In accordance with example implementations of the present invention, a first calculation may provide an initial estimate of an amount of time for a particular user to read a particular document in a particular context. Such an initial estimate may be derived based on attributes of the document itself, for example, by determining an amount of time for a generic user to read the particular document in a generic context. In example implementations of the present disclosure, a further calculation may provide a correction time or parameter, for modifying an estimate, such as the initial time estimate, to take into account, or compensate for, the reading context, for example to take into account the particular context, such as the environment, in which reading will take place. In example implementations of the present invention, a further calculation may provide a correction time or parameter, for modifying an estimate, such as the initial time estimate, to take into account, or compensate for, the particular user, for example to take into account the reading skills and knowledge of the particular user. Accordingly, example implementations use a further calculation to improve an initial reading time estimate by adjusting or compensating for user-related or context-related factors that may influence a user's cognitive reading speed, in terms of reading quality as well as quantity, and thus the amount of time for the user to read the document.

In the present invention, one or more estimates of an amount of time for a user to read a document are disclosed. As the skilled person will appreciate, such an amount of time may be dependent upon the level of understanding or comprehension of the document required by the user. Accordingly, in the present invention, references to an amount of time for a user read a document are intended to denote an amount of time for the user to read and understand the document at an appropriate comprehension level. In addition, in the present invention, references to a document include one or more parts of a document or a plurality of related documents.

Figure 2:
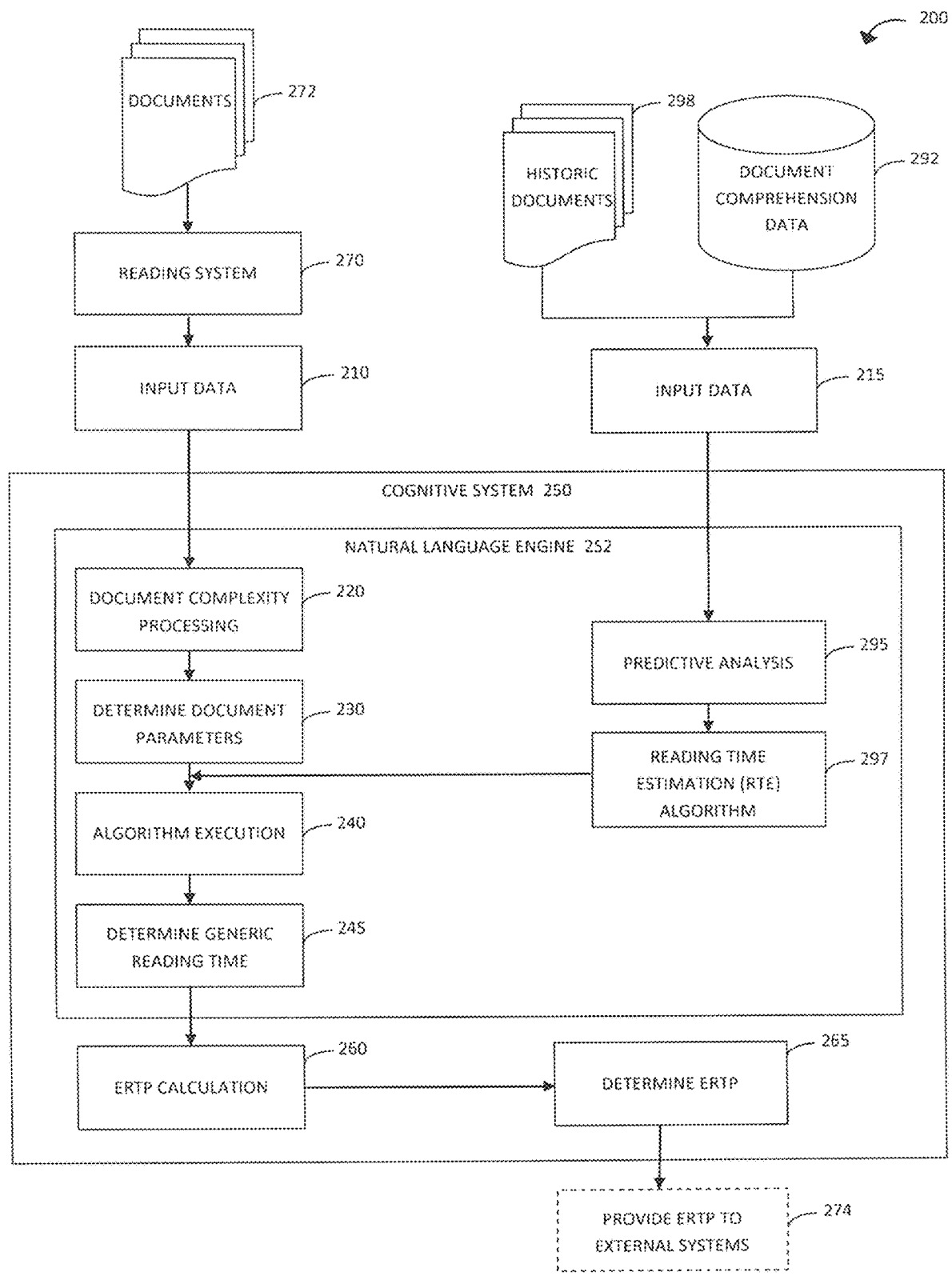
FIG. 2 is a schematic diagram illustrating a first method, in accordance with embodiments of the present invention.

FIG. 2 is a schematic diagram illustrating a first method 200, in accordance with embodiments of the present invention. In particular, although not exclusively, at least a part of the method may be performed by the time estimation unit 40 running on the processing unit 22 of the computing device 20 of FIG. 1. The method may be used to perform a first calculation for determining an initial estimate of an amount of time for a generic (i.e., average or typical) user to read a particular document in a generic (i.e., average or typical) context (e.g., environment or state).

In the example implementations of FIG. 2, the method may use data, relating to the above-described document parameters of document comprehension data relating to the complexity of a document, to determine a generic time to read a particular document. In particular, a document 272 may be loaded into a reading system 270. In example implementations, the reading system 270 may be an electronic book reader or computing application enabling a document to be read, and the document may be loaded into the reading system 270 by a user selecting and opening the document 272 (e.g., from an electronic folder in memory associated with the reading system 270).

In response to the document 272 being loaded into the reading system 270, or in response to another interaction by the user with the reading system 270, the method 200 may transmit input data (step 210) comprising document data defining the document 272 to a natural language engine (NLE) module 252 of the cognitive system 250, in accordance with the present invention. In accordance with the method 200, the NLE module 252 may evaluate the document 272 using document complexity processing (step 220) and determine one or more values of document parameters (step 230) for the document 272. The document parameters may be parameters of a predefined set of document parameters of the document comprehension data as described above. The document complexity processing may comprise any suitable technique for evaluating the complexity of a document, including the text and/or any associated drawings. An example of a suitable document complexity calculation method is proposed in US Patent Application Publication No: US2014/0234810A entitled "Systems and Methods for Determining Text Complexity". As the skilled person will appreciate, various other suitable methods are possible and contemplated by the present invention.

The NLE module 252 may receive an algorithm 297 (herein referred to as "reading time estimation (RTE) algorithm") for determining an estimate of the time needed for a genetic user to read the document 272 based on values of parameters of a predefined set of document parameters. Details of suitable RTE algorithms 297, and derivation and/or selection of the suitable RTE algorithms 297, are provided below. The NLE module 252 may execute the RTE algorithm (step 240) using the values of the document parameters (determined in step 230) and may determine a generic reading time (step 245) for a user to read the document 272.

The NLE module 252 may transmit the generic reading time to the cognitive system 250 for performing a first calculation to determine an initial estimate of the time needed for a user to read the document 272. In particular, an estimated reading time parameter (ERTP) calculation may receive the generic reading time from the NLE module 252 (step 260) and calculate an ERTP (step 265) for a user to read the document 272, as described in more detail below. The method 200 may optionally transmit the ERTP to an external system 274, such as a calendar system and/or present the ERTP to the user, for example via display on a user interface of a computing device, reading system or the like.

As described above, the method 200 of FIG. 2 utilizes an RTE algorithm 297 for determining an estimate of the time for a generic user to read a particular document, in a generic context, based on one or more parameter values of a set of document parameters. The RTE algorithm may be derived using the NLE module 252, or may derived using another natural language processor, machine learning system or the like and provided to the NLE module 252. In accordance with example implementations, and for ease of illustration in FIG. 2, the NLE module 252 may derive the RTE algorithm 297 as set out below.

In particular, either prior to, concurrently with, or subsequent to performing the document complexity processing (step 220), the NLE module 252 may receive input historical data 90 (step 215) comprising document data defining historic documents 298, corresponding document comprehension data 292 associated with actual historical reading times of the historic documents 298, and corresponding actual reading time data for the historic documents 298. The NLE module 252 may perform predictive analysis (step 295) using the received input data to provide an RTE algorithm 297 for determining an estimate of an amount of time for a user to read a document. In particular, although not exclusively, example implementations may perform predictive analysis (step 295) to determine a set of weights for each parameter of a predefined set of document parameters of document comprehension data, where a weight for a document parameter indicates a relative impact on the reading time of the particular document parameter based on analysis of the received historical data. In example implementations, the predictive analysis (step 290) may be performed in accordance with a predictive analysis tool, such as the IBM® SPSS® (IBM and SPSS are registered trademarks of International Business Machines Corporation in the United States, other countries, or both) Modeler, whereby a suitable model is built, trained and analyzed using historical data that includes previous actual particular document reading times taken by particular users in particular reading contexts that have been collected and stored with associated document, context and/or user data, for example as the actual reading time data described above in relation to FIG. 1.

In example implementations of the present invention, a single optimized RTE algorithm 297 may be provided by the predictive analysis (step 295). In other example implementation, multiple RTE algorithms 297 may be determined using the predictive analysis and a level of certainty determined for each RTE algorithm 297 to indicate the level of certainty of a time estimate determined using that RTE algorithm. One or more of the RTE algorithms 297 may be selected for use, where the selection is based on the RTE algorithm(s) with the highest certainty levels. As indicated above, in other example implementations, the RTE algorithm 297 may be determined independently, and provided to the NLE module 252 of FIG. 2, after determination of the document parameters (i.e., after step 230).

Figure 3:
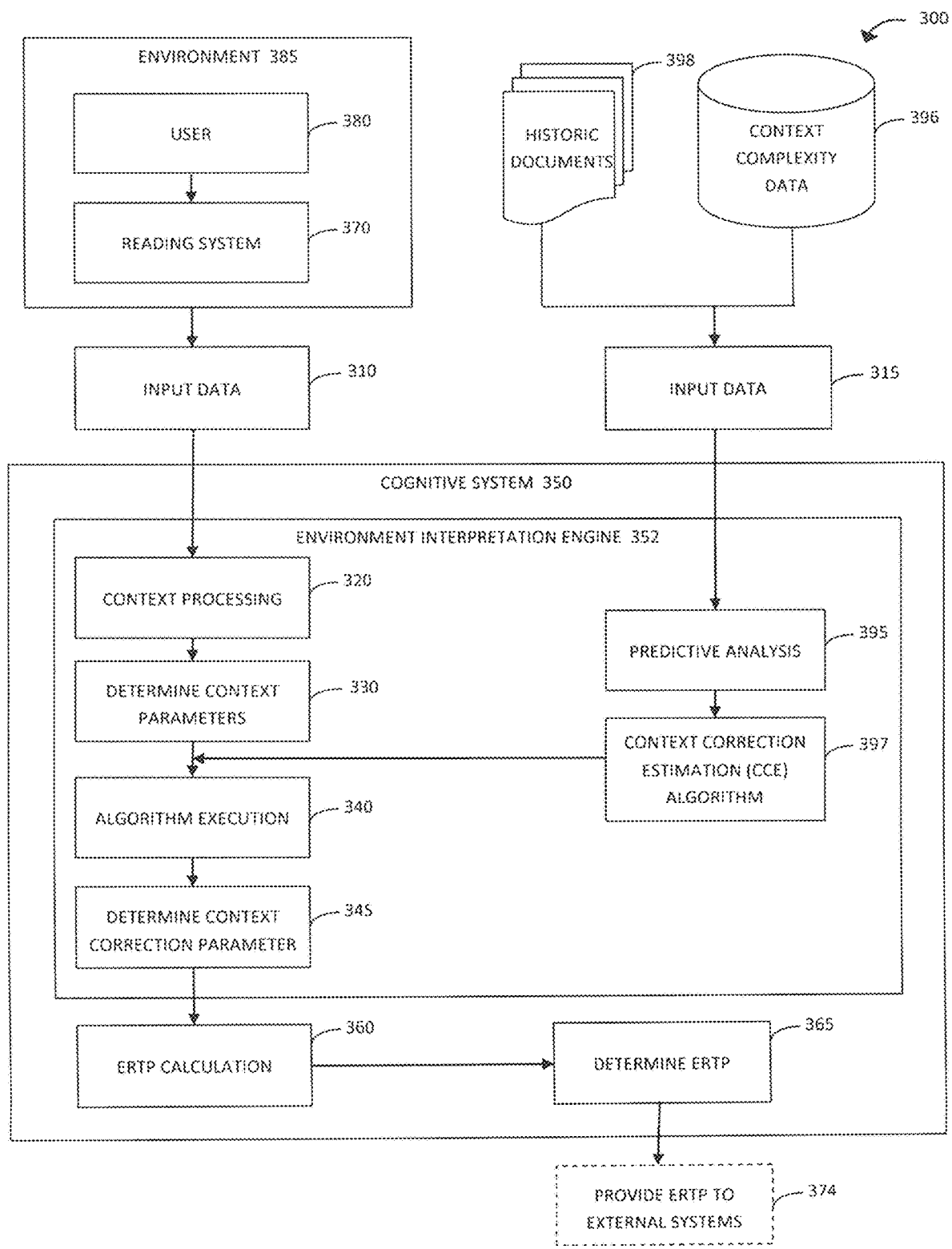
FIG. 3 is a schematic diagram illustrating a second method, in accordance with embodiments of the present invention.

FIG. 3 is a schematic diagram illustrating a second method 300, in accordance with embodiments of the present invention. In particular, although not exclusively, at least a part of the method of FIG. 3 may be performed by the time estimation unit 40 is running on the processing unit 22 of the computing device 20 of FIG. 1. The method may be used in a further calculation for determining a correction time or parameter, for modifying a reading time estimate, such as an initial time estimate (determined using, for example, the method of FIG. 2), to take into account, or compensate for, a context, such as the environment or state of a user, in which reading will take place.

In the example implementations of FIG. 3, the method 300 may use data, relating to the above-described context parameters of context complexity data for a particular reading context, to determine a correction time or parameter to take account of, or compensate for, a particular reading context. In particular, as shown in FIG. 3, a user 380 may plan to read a document on a reading system 370 in a context, such as an environment 385. In example implementations, the reading system 370 may be an electronic book reader or computing application enabling a document to be read. The method 300 of FIG. 3 may be initiated either independent of a method for performing a first calculation for determining an initial estimate, such as the method 200 of FIG. 2, or may be initiated dependent thereon. In example implementations, the method of FIG. 3 may be initiated in response to the user 380 loading a document (not shown) into the reading system 370 or in response to another interaction by the user 380. In example implementations, the method 300 of FIG. 3 may be initiated in response to any stage of the method of FIG. 2.

In response to initiation of the method 300, the method may transmit input data (step 310) to an environment interpretation engine (EIE) module 352 of a cognitive system 350, the input data relating to the context (e.g., environment or state) of the user 380 and/or reading system 370. The context data may be raw or processed data values associated with one or more parameters of a predefined set of context parameters, as described above. The context data may be received from external devices, such as sensor devices 78 (as shown in FIG. 1) associated with the context (e.g., environment 385), the reading system 380 and/or the user 380, or internal devices within the computing system comprising the cognitive system 350. For example, values for environmental conditions may be provided a camera, microphone or thermometer associated with the reading system 370, the user 380 or the environment 385, or may be independent therefrom. Values for time-based context parameters may be provided by an internal clock of the computing system comprising the cognitive system 350. Values for fatigue conditions may be provided by external user devices such as a blood pressure monitor, a heart rate monitor, a stress management device or an application running on a personal user device, or an internal personal user application or module running on the computing system comprising the cognitive system 250. As the skilled person will appreciate, many other possibilities exist for providing context parameter values and are contemplated by the present invention.

The EIE module 352 may process the received input data (step 320) and determine one or more values of context parameters (step 330), as described above. The context parameters may be parameters of a predefined set of context parameters of the context complexity data as described above. The context processing performed by the EIE module 352 may comprise any suitable technique for evaluating the complexity of a context (e.g., environment or state) in which a document may be read, in order to derive context parameter values for the context. Examples of suitable context processing methods are proposed in International Patent Application Publication Nos: WO2014/159297A entitled "Context Emotion Determination System" and WO2014/145228A entitled "Mental State Well Being Monitoring", and Chinese Patent Publication No: CN101783881A entitled "Intelligent Web Camera with Video Structural Description Function". As the skilled person will appreciate, various other suitable methods are possible and contemplated by the present invention.

The EIE module 352 may receive an algorithm 397 (herein referred to as "context correction estimation (CCE) algorithm") for determining an estimate of a correction time/parameter for modifying a reading time estimate, such as the above initial estimate, that compensates for the context in which the document will be read. Thus, the CCE algorithm 397 may use a predefined set of context parameters relating to the context (e.g., environment or state) in which a document may be read. Details of suitable CCE algorithms 397, and their derivation and/or selection, are provided below. The EIE module 352 may execute the CCE algorithm (step 340) using the determined values of the context parameters and may determine a context correction time/parameter (step 345) for a user to read a document.

The EIE module 352 may transmit the context correction tire/parameter to the cognitive system 350 for performing a further calculation to modify an estimate, such as the above initial estimate, of an amount of time for a user to read a document, for example as provided by the method of FIG. 2 (step 260). In particular, an estimated reading time parameter (ERTP) calculation may receive the context correction time/parameter (step 360) from the EIE module 352 and use it to calculate an ERTP (step 365) for a user to read a document, as described in more detail below. The method 300 may optionally transmit the ERTP to an external system 374, such as a calendar system and/or present the ERTP to the user, for example via display on a user interface of a computing device, reading system or the like.

As described above, the method 300 of FIG. 3 utilizes a CCE algorithm 397 for determining an estimate of a correction time/parameter for modifying an estimate of a time for a use to read a document to take account of a particular reading context. The CCE algorithm 397 may be derived using the EIE module 352 or using another machine learning system or the like and provided to the EIE module 352. In accordance with example implementations, and for ease of illustration in FIG. 3, the EIE module 352 may derive the CCE algorithm 397 as set out below.

In particular, either prior to, concurrently with, or subsequent to performing the context processing (step 320), the EIE module 352 may receive input historical data 90 (step 315) comprising document data for historic documents 398, corresponding context complexity data 396 associated with actual historical reading times of the historic documents 398 and corresponding actual reading time data for the historic documents 398. The EIE module 352 may perform predictive analysis (step 395) using the received input data to provide a CCE algorithm 397 for determining an estimate of the correction time/parameter for modifying a reading time estimate to account for a reading context. In particular, although not exclusively, example implementations may perform predictive analysis (step 395) to determine a set of weights for each parameter of a predefined set of context parameters of context complexity data, where a weight for a context parameter indicates a relative impact on the reading time of the particular context parameter based on analysis of the received historical data. In example implementations, the predictive analysis (step 395) may be performed in accordance with a predictive analysis tool, such as the IBM SPSS Modeler, whereby a suitable model is built and trained using historical data that includes previous document actual reading times taken by individual users in particular reading contexts that have been collected and stored with associated document, context and/or user data, for example as the actual reading time data described above in relation to FIG. 1.

In example implementations, a single optimized CCE algorithm 397 may be provided by the predictive analysis (step 395). In other example implementation, multiple CCE algorithms 397 may be determined using the predictive analysis and a level of certainty determined for each CCE algorithm 397 to indicate the level of certainty of a time estimate determined using that CCE algorithm. One or more of the CCE algorithms 397 may be selected for use, where the selection is based on the CCE algorithm(s) with the highest certainty levels. As indicated above, in other example implementations, the CCE algorithm 397 may be determined independently, and provided to the EIE module 352 of FIG. 2, after determination of the context parameters (i.e., after step 330).

Figure 4:
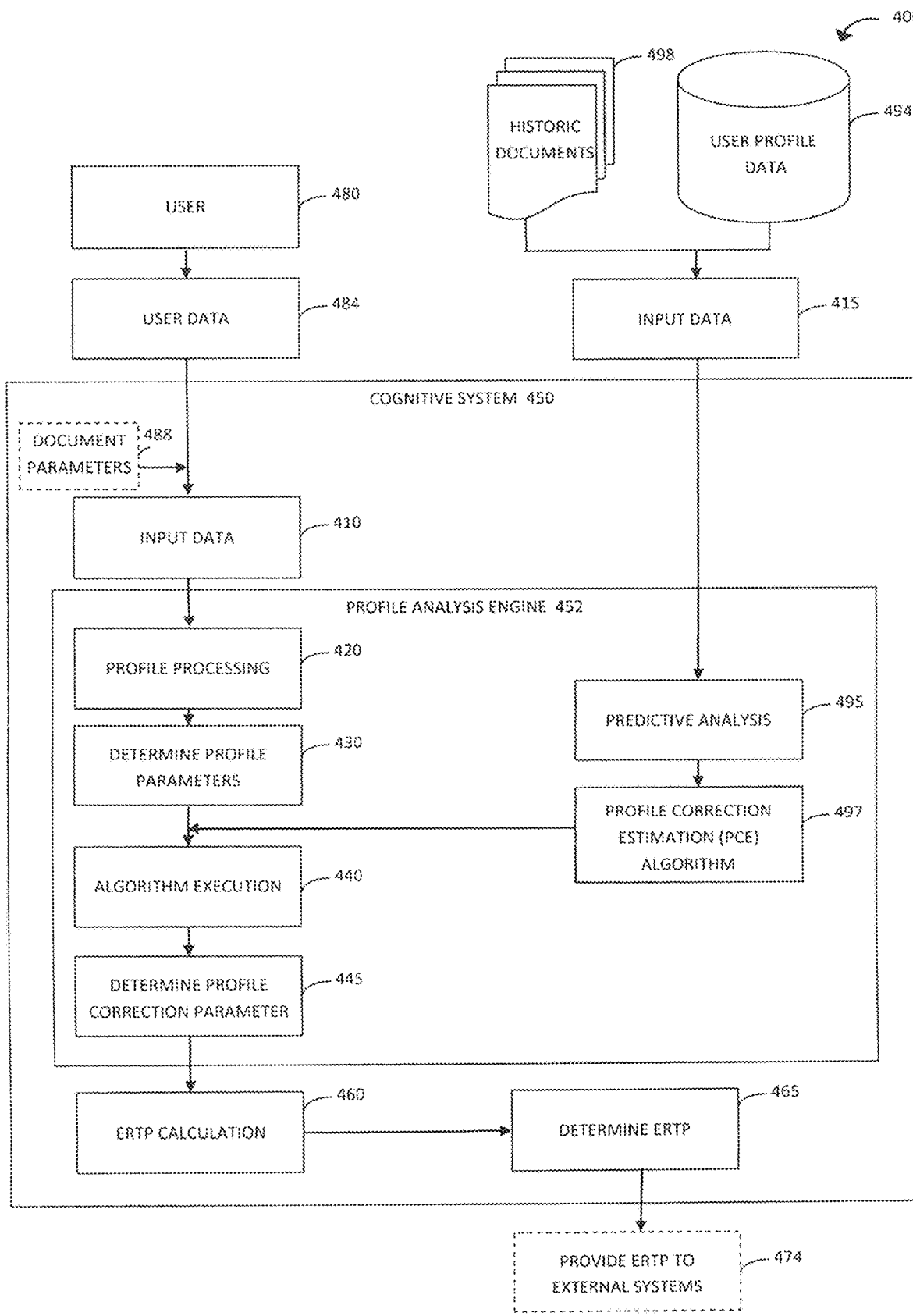
FIG. 4 is a schematic diagram illustrating a third method, in accordance with embodiments of the present invention.

FIG. 4 is a schematic diagram illustrating a third method 400, in accordance with embodiments of the present invention. In particular, although not exclusively, at least a part of the method of FIG. 4 may be performed by the time estimation unit 40 is running on the processing unit 22 of the computing device 20 of FIG. 1. The method may be used in a further calculation for determining a correction time, for modifying a reading time estimate, such as an initial time estimate (determined using, for example, the method of FIG. 2) or a modified time estimate (determined using, for example, the method of FIG. 3), to take into account, and thus compensate for, a particular user who will read the document.

In the example implementations of FIG. 4, the method 400 may use data, relating to the above-described profile parameters of users, in order to determine a profile correction time/parameter to take account of, or compensate for, the particular user. In particular, as shown in FIG. 4, a user 480 may plan to read a document on a reading system (not shown) having associated user data 484, or the user 480 may input relevant user data 484. In example implementations, the reading system may be an electronic book reader or computing application enabling a document to be read, which may require a user to "login" and may store an associated user profile as at least part of user data 484. The method 400 of FIG. 4 may be initiated either independent of a method for performing a first calculation for determining an initial estimate, such as the method 200 of FIG. 2, or may be initiated dependent thereon. In example implementations, the method of FIG. 4 may be initiated in response to the user 480 loading a document (not shown) into the reading system or in response to another interaction by the user 480. In example implementations, the method 400 of FIG. 4 may be initiated in response to any stage of the method of FIG. 2.

In response to initiation of the method 400, the method may transmit input data (step 410), to a profile analysis engine (PAE) module 452 of an cognitive system 450, the input data comprising user data 484 relating to a profile of the user 480 and, optionally document parameters 488 of the particular document. The user data 484 may be received from external devices, such as the reading system (not shown) and/or input by the user 480, and/or internal devices within the computing system comprising the cognitive system 450. The document parameters 488 may be received, for example, from the NLE engine 252 as determined in step 230 of the method of FIG. 2. In the example implementations of FIG. 4, the document parameters 488 may be used to select a subset of profile parameters of the user data 484, that are relevant to, for example impact on or influence the reading time for the particular document. However, as the skilled person will appreciate, profile parameters for the user may be determined without the use of document parameters 488.

The PAE module 452 may process the received input data (step 420) and determine values of one or more profile parameters (step 430) of the user, as described above. The profile parameters may be parameters of a predefined set of profile parameters of the user profile data, or a subset thereof selected based on the document parameters, as described above. The profile processing performed by the PAE module may comprise any suitable technique for evaluating the profile of the user who will read the document, in order to derive values of parameters of a predefined set of profile parameters for the particular user. Examples of suitable methods for determining profile parameters for a user are well known to a person skilled in the art.

The PAE module 452 may receive an algorithm 497 (herein referred to as "profile correction estimation (PCE) algorithm") for determining an estimate of a correction time/parameter for modifying a reading time estimate to take into account, or compensate for, the particular user who will read the document, based on user data (i.e., the user's profile). Thus, the PCE algorithm 497 may use a predefined set of profile parameters, as described above, that impact on or influence the reading time f a particular user. Details of suitable PCE algorithms 497, and their derivation and/or selection, are provided below. The PAE module 352 may execute the PCE algorithm (step 440) using the determined values of the profile parameters and may determine a profile correction time/parameter (step 445) for a user to read a document.

The PAE module 452 may transmit the profile correction time/parameter to the cognitive system 450 for performing a further calculation to modify an estimate, such as the above initial estimate, of an amount of time for a user to read a document, for example as provided by the method of FIG. 2. (step 260). In particular, an estimated reading time parameter (ERTP) calculation may receive the profile correction time/parameter (step 460) from the PAE module 452 and use it to calculate an ERTP (step 465) for a particular user to read a document, as described in more detail below. The method 400 may optionally transmit the ERTP to an external system 474, such as a calendar system and/or present the ERTP to the user, for example via display on a user interface of a computing device, reading system or the like.

As described above, the method 400 of FIG. 4 utilizes a PCE algorithm 497 for determining an estimate of a correction time/parameter for modifying an estimate of a time for a user to read a document to take account of a particular user. The PCE algorithm 497 may be derived using the PAE module 452 or using another machine learning system or the like and provided to the PAE module 452. In accordance with example implementations, and for ease of illustration in FIG. 4, the PAE module 452 may derive the PCE algorithm 497 as set out below.

In particular, either prior to, concurrently with, or subsequent to performing the context processing (step 420), the PAE module 452 may receive input historical data 90 (step 415) comprising document data for historic documents 498, corresponding user data, such as user profile data 494, associated with historical readings by users of the historic documents 498, and corresponding actual reading time data for the historic documents 498. The PAE module 452 may perform predictive analysis (step 495) using the received input data to provide a PAE algorithm 497 for determining an estimate of the correction time/parameter for modifying an initial reading time estimate to account for the particular user. In particular, although not exclusively, example implementations may perform predictive analysis (step 495) to determine a set of weights for each parameter of a predefined set of profile parameters of user profile data, where a weight for a profile parameter indicates a relative impact on the reading time of the particular profile parameter based on analysis of the received historical data. In example implementations, the predictive analysis (step 495) may be performed in accordance with a predictive analysis tool, such as the IBM SPSS Modeler, whereby a suitable model is built and trained using historical data that includes previous document actual reading times taken by individual users that have been collected and stored with associated document, context and/or user data, for example as the actual reading time data described above in relation to FIG. 1.

In example implementations, a single optimized PCE algorithm 497 may be provided by the predictive analysis (step 495). In other example implementation, multiple PCE algorithms 497 may be determined using the predictive analysis and a level of certainty determined for each PCE algorithm 497 to indicate the level of certainty of a time estimate determined using that PCE algorithm. One or more of the PCE algorithms 397 may be selected for use, where the selection is based on the PCE algorithm(s) with the highest certainty levels. As indicated above, in other example implementations, the PCE algorithm 497 may be determined independently, and provided to the PAE module 452 of FIG. 2, after determination of the context parameters (i.e., after step 430).

In accordance with example implementations of the present invention, the above-described methods of FIGS. 2, 3 and 4, may be used to determine an improved (i.e., more optimized) estimate of the reading time for a particular user to read a particular document in a particular context (e.g., environment or state) in an ERTP calculation. In particular, an initial estimate of the amount of reading time may be provided by the NLE module 250 (step 245 of FIG. 2), a context correction time/parameter may be provided by the EIE module 352 (step 345 of FIG. 3) and a profile correction time/parameter may be provided by the PAE module 452 (step 445 of FIG. 4) for the ERTP calculation. In example implementations, the ERTP calculation may comprise adding together an initial estimate of an amount of reading time, a context correction time and a profile correction time in order to derive the optimized estimate. Normalization of the context correction time and/or the profile correction time may be performed prior to addition to the initial reading time estimate. In example implementations, the ERTP calculation may comprise using a context correction parameter to derive a correction time and using a profile correction parameter to derive a profile correction time, and adding together an initial estimate of the amount of reading time, the context correction time and the profile correction time, in order to derive the optimized estimate. As the skilled person will appreciate, other suitable methods may be used for deriving an optimized estimate of the reading time, which may be dependent on the techniques used for providing the context correction time/parameter and/or the profile correction time/parameter.

In addition, example implementations of the present invention may be used to dynamically update the estimated reading time, for example prior to or during reading of the document. For example, changes in the reading context, such as the environment or state in which the user is reading, may be monitored in real time and used to update the input data to the EIE module 352 in the method of FIG. 3, to provide an updated context correction parameter. The ERTP calculation may then provide an updated estimate of the remaining reading time of the particular document for the user to account for the changed context.

Various modifications and changes may be made to the above described example implementations. For instance, example implementations of the present invention may utilize just one of the methods of FIGS. 3 and 4 to derive a correction for the initial reading time estimate provided by the method of FIG. 2. Thus, in example implementations of the present invention, an optimized estimate of the reading time for a document for a generic[*] user in a specific context (e.g., environment or state) may be provided using a combination of the methods disclosed in FIGS. 2 and 3. Similarly, in example implementations of the present invention, an optimized estimate of the reading time for a document for a specific user in a generic context (e.g., environment or state) may be provided using a combination of the methods disclosed in FIGS. 2 and 4. In addition, example implementations may collect and store the described historical data 90 in separate databases, for example as described in relation to FIG. 1, in a combined database or in any other suitable manner, for use in accordance with the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The compute readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In one embodiment, the system of the present invention may be or include a hardware device such as a computer, portable device, etc. In one embodiment, the hardware device is or includes a special-purpose device (e.g., computer, machine, portable device) that comprises specialized, non-generic hardware and circuitry (i.e., specialized discrete non-generic analog, digital, and logic based circuitry) for (independently or in combination) particularized for executing only methods of the present invention. The specialized discrete non-generic analog, digital, and logic based circuitry may include proprietary specially designed components (e.g., a specialized integrated circuit, such as for example an Application Specific Integrated Circuit (ASIC), designed for only implementing methods of the present invention).

A computer program product of the present invention may include one or more computer readable hardware storage devices having computer readable program code stored therein, said program code containing instructions executable by one or more processors of a computing system (or computer system) to implement the methods of the present invention.

A system of the present invention may include one or more processors, one or more memories, and one or more computer readable hardware storage devices, said one or more hardware storage devices containing program code executable by the one or more processors via the one or more memories to implement the methods of the present invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others or ordinary skill in the art to understand the embodiments disclosed herein.

What is claimed is:

1. A method implemented by a hardware device, said method comprising:
    determining, by the hardware device, an initial estimate of an amount of time for a generic user to read a document, wherein the initial estimate is determined based on a value of one or more parameters associated with the document;
    receiving, by the hardware device, context parameters that impact an amount of time for a particular user to read the document, said receiving context parameters comprising receiving environmental conditions and receiving user fatigue conditions, said receiving environmental conditions comprising receiving temperatures from a thermometer and noise levels from a microphone, said receiving user fatigue conditions comprising receiving health data from a blood pressure monitor, a heart rate monitor, and a stress management device, said received health data pertaining to the particular user;
    determining, by the hardware device using at least the received context parameters, an estimate correction parameter for modifying the determined initial estimate of an amount of time for a generic user to read a document; and
    ascertaining, by the hardware device using the initial estimate and the estimate correction parameter, an estimate of the amount of time for the particular user to read the document, said ascertaining comprising: (a) training an algorithm to perform predictive analysis to determine a set of weights for each profile parameter of a predefined set of profile parameters based on historical data relating to previous readings of documents by users, said algorithm comprising the profile factors, said profile parameters relating to factors that impact the amount of time for the particular user to read the document; and (b) executing, by the hardware device, the algorithm to determine the estimate of the amount of time for the particular user to read the document.

2. The method of claim 1, wherein said determining the estimate correction parameter comprises:
    receiving document data relating to the document, wherein the document data comprise one or more values of document parameters relating to the document, and wherein the document parameters relate to factors that impact the amount of time for the particular user to read the document.

3. A system, comprising a hardware device configured to implement a method, said method comprising:
    determining, by the hardware device, an initial estimate of an amount of time for a generic user to read a document, wherein the initial estimate is determined based on a value of one or more parameters associated with the document;
    receiving, by the hardware device, context parameters that impact an amount of time for a particular user to read the document, said receiving context parameters comprising receiving environmental conditions and receiving user fatigue conditions, said receiving environmental conditions comprising receiving temperatures from a thermometer and noise levels from a microphone, said receiving user fatigue conditions comprising receiving health data from a blood pressure monitor, a heart rate monitor, and a stress management device, said received health data pertaining to the particular user;
    determining, by the hardware device using at least the received context parameters, an estimate correction parameter for modifying the determined initial estimate of an amount of time for a generic user to read a document; and
    ascertaining, by the hardware device using the initial estimate and the estimate correction parameter, an estimate of the amount of time for the particular user to read the document, said ascertaining comprising: (a) training an algorithm to perform predictive analysis to determine a set of weights for each profile parameter of a predefined set of profile parameters based on historical data relating to previous readings of documents by users, said algorithm comprising the profile factors, said profile parameters relating to factors that impact the amount of time for the particular user to read the document; and (b) executing, by the hardware device, the algorithm to determine the estimate of the amount of time for the particular user to read the document.

4. The system of claim 3, wherein said determining the estimate correction parameter comprises:
    receiving document data relating to the document, wherein the document data comprise one or more values of document parameters relating to the document, and wherein the document parameters relate to factors that impact the amount of time for the particular user to read the document.

5. A computer program product, comprising a computer readable hardware storage medium having computer readable program code stored therein, said program code containing instructions executable by a hardware device to implement a method, said method comprising:

determining, by the hardware device, an initial estimate of an amount of time for a generic user to read a document, wherein the initial estimate is determined based on a value of one or more parameters associated with the document;

receiving, by the hardware device, context parameters that impact an amount of time for a particular user to read the document, said receiving context parameters comprising receiving environmental conditions and receiving user fatigue conditions, said receiving environmental conditions comprising receiving temperatures from a thermometer and noise levels from a microphone, said receiving user fatigue conditions comprising receiving health data from a blood pressure monitor, a heart rate monitor, and a stress management device, said received health data pertaining to the particular user;

determining, by the hardware device using at least the received context parameters, an estimate correction parameter for modifying the determined initial estimate of an amount of time for a generic user to read a document; and ascertaining, by the hardware device using the initial estimate and the estimate correction parameter, an estimate of the amount of time for the particular user to read the document, said ascertaining comprising: (a) training an algorithm to perform predictive analysis to determine a set of weights for each profile parameter of a predefined set of profile parameters based on historical data relating to previous readings of documents by users, said algorithm comprising the profile factors, said profile parameters relating to factors that impact the amount of time for the particular user to read the document; and (b) executing, by the hardware device, the algorithm to determine the estimate of the amount of time for the particular user to read the document.

6. The computer program product of claim 5, wherein said determining the estimate correction parameter comprises:

receiving document data relating to the document, wherein the document data comprise one or more values of document parameters relating to the document, and wherein the document parameters relate to factors that impact the amount of time for the particular user to read the document.

\* \* \* \* \*